US012640099B2

(12) United States Patent
Peng et al.

(10) Patent No.: US 12,640,099 B2
(45) Date of Patent: May 26, 2026

(54) DISPLAY PANEL AND DISPLAY DEVICE

(71) Applicant: Wuhan China Star Optoelectronics Semiconductor Display Technology Co., Ltd., Wuhan (CN)

(72) Inventors: Wenlong Peng, Wuhan (CN); Tao Chen, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 18/963,532

(22) Filed: Nov. 28, 2024

(65) Prior Publication Data

US 2025/0095586 A1 Mar. 20, 2025

Related U.S. Application Data

(63) Continuation of application No. 17/781,070, filed as application No. PCT/CN2022/095135 on May 26, 2022, now Pat. No. 12,183,288.

(30) Foreign Application Priority Data

May 7, 2022 (CN) ........................ 202210494238.9

(51) Int. Cl.
*G09G 3/30* (2006.01)
*G09G 3/20* (2006.01)
*G09G 3/3258* (2016.01)

(52) U.S. Cl.
CPC ......... *G09G 3/3258* (2013.01); *G09G 3/2092* (2013.01); *G09G 2300/0842* (2013.01);
(Continued)

(58) Field of Classification Search
None
See application file for complete search history.

(56) References Cited

U.S. PATENT DOCUMENTS 11,069,295 B2 7/2021 Nam et al.
11,195,468 B2 12/2021 Park et al.
(Continued)

FOREIGN PATENT DOCUMENTS

CN 111009218 4/2020
CN 111489674 8/2020
(Continued)

OTHER PUBLICATIONS

Decision of Rejection Dated Aug. 31, 2023 From the State Intellectual Property Office of the People's Republic of China Re. Application No. 202210494238.9 and its Translation Into English. (15 Pages).

(Continued)

*Primary Examiner* — Joseph R Haley

(57) ABSTRACT

A display panel and a display device are disclosed. By setting numbers of effective pulses of first start signals in both a writing frame and a holding frame of one display period to be plural, a plurality of first strobe driving circuits connected in cascade are allowed to output a plurality of first strobe signals multiple times to adjust a bias voltage of a first transistor of a plurality of pixel driving circuits. Therefore, the display panel can display at a similar light-emitting brightness in both the writing frame and the holding frame, thereby improving a flickering problem of the display panel.

18 Claims, 2 Drawing Sheets

(52) U.S. Cl.
CPC ............... *G09G 2320/0233* (2013.01); *G09G 2320/0247* (2013.01); *G09G 2330/021* (2013.01); *G09G 2340/0435* (2013.01)

(56) References Cited

U.S. PATENT DOCUMENTS

| | | | | |
|---|---|---|---|---|
| 11,211,010 | B2 | 12/2021 | Yuan | |
| 11,282,461 | B2 | 3/2022 | Li et al. | |
| 11,417,283 | B2 | 8/2022 | Son et al. | |
| 11,538,399 | B2 | 12/2022 | Li et al. | |
| 11,538,407 | B2 | 12/2022 | Lee et al. | |
| 11,538,412 | B1 | 12/2022 | Zhang | |
| 11,620,945 | B2 | 4/2023 | Zhang et al. | |
| 11,749,169 | B2 | 9/2023 | Zhang et al. | |
| 11,869,446 | B2 | 1/2024 | Park et al. | |
| 11,961,477 | B2 | 4/2024 | Zhang et al. | |
| 12,165,581 | B2 | 12/2024 | Liu et al. | |
| 12,170,063 | B2 | 12/2024 | Chen et al. | |
| 2020/0082768 | A1 | 3/2020 | Oh et al. | |
| 2021/0201800 | A1 | 7/2021 | Ahn et al. | |
| 2022/0366830 | A1 | 11/2022 | Zhang et al. | |
| 2023/0316976 | A1* | 10/2023 | Zhou | G09G 3/20 345/212 |
| 2024/0221666 | A1 | 7/2024 | Chen et al. | |

FOREIGN PATENT DOCUMENTS

| | | |
|---|---|---|
| CN | 111710299 | 9/2020 |
| CN | 112071262 | 12/2020 |
| CN | 112150967 | 12/2020 |
| CN | 112397026 | 2/2021 |
| CN | 112634832 | 4/2021 |
| CN | 112687234 | 4/2021 |
| CN | 112735334 | 4/2021 |
| CN | 112771602 | 5/2021 |
| CN | 113012643 | 6/2021 |
| CN | 113380193 | 9/2021 |
| CN | 113436577 | 9/2021 |
| CN | 113763888 | 12/2021 |
| CN | 113838420 | 12/2021 |
| CN | 113906495 | 1/2022 |
| CN | 114038383 | 2/2022 |
| CN | 114038430 | 2/2022 |
| CN | 114420034 | 4/2022 |
| JP | 2005-300702 | 10/2005 |

OTHER PUBLICATIONS

International Search Report and the Written Opinion Dated Dec. 19, 2022 From the International Searching Authority Re. Application No. PCT/CN2022/095135 and its Translation Into English. (18 Pages).

Notification of Office Action and Search Report Dated Mar. 8, 2023 From the State Intellectual Property Office of the People's Republic of China Re. Application No. 202210494238.9 and its Translation Into English. (22 Pages).

Notification of Office Action and Search Report Dated Jun. 9, 2023 From The State Intellectual Property Office of the People's Republic of China Re. Application No. 202210494238.9 and its Translation Into English. (25 Pages).

* cited by examiner

DISPLAY PANEL AND DISPLAY DEVICE

CROSS-REFERENCE TO RELATED APPLICATION

This application is a continuation application of U.S. application Ser. No. 17/781,070, filed on May 31, 2022, which is a National Phase application of PCT Patent Application No. PCT/CN2022/095135, filed on May 26, 2022, which claims the priority of Chinese Patent Application No. 202210494238.9, filed on May 7, 2022 and entitled "Display Panel and Display Device", the contents of which are incorporated herein by reference in their entireties.

TECHNICAL FIELD

The present disclosure relates to the field of display technologies, and more particularly, to a display panel and a display device.

BACKGROUND

Using dynamic refresh frequencies to realize display control of display panels can reduce a power consumption of the display panels. However, the display panels have a flickering problem when displayed in a low refresh frequency.

Technical problem: an embodiment of the present disclosure provides a display panel and a display device to improve the flickering problem of the display panels when displayed in the low refresh frequency.

SUMMARY

An embodiment of the present disclosure provides a display panel, which includes a plurality of pixel driving circuits, a plurality of first strobe driving circuits connected in cascade, and a plurality of second strobe driving circuits connected in cascade.

Each of the pixel driving circuits at least includes a light-emitting device, a first transistor, a second transistor, and a third transistor. A gate electrode of the first transistor is electrically connected to a first node, one of a source electrode or a drain electrode of the first transistor is electrically connected to a second node, and another one of the source electrode or the drain electrode of the first transistor is electrically connected to a third node; the source electrode and the drain electrode of the first transistor are connected in series with the light-emitting device between a first voltage terminal and a second voltage terminal, a source electrode and a drain electrode of the second transistor are connected in series between a corresponding data line and the second node, and a source electrode and a drain electrode of the third transistor are connected in series between the first node and the third node.

The first strobe driving circuits connected in cascade are electrically connected to a gate electrode of the second transistor of the pixel driving circuits and output a plurality of first strobe signals according to first start signals.

The second strobe driving circuits connected in cascade are electrically connected to a gate electrode of the third transistor of the pixel driving circuits and output a plurality of second strobe signals according to second start signals.

The first strobe driving circuits and the second strobe driving circuits respectively control the second transistor and the third transistor of the pixel driving circuits according to the first start signals and the second start signals to transmit data signals.

The data signals have a first voltage value in a wiring frame of one display period, the data signals have a second voltage value in a holding frame of the display period, and the first voltage value is not equal to the second voltage value.

Optionally, in some embodiments of the present disclosure, in the writing frame, the first voltage value of the data signals includes a third voltage value and a fourth voltage value, when both the second transistor and the third transistor are turned on, the data signals have the third voltage value; and when only the second transistor is turned on, the data signals have the fourth voltage value, wherein the third voltage value is different from the fourth voltage value.

Optionally, in some embodiments of the present disclosure, the first voltage value is greater than or equal to 0.5V and less than or equal to 8V.

Optionally, in some embodiments of the present disclosure, effective pulses of the first start signals are set in the writing frame and the holding frame of the display period, an effective pulse of the second start signals is set in the writing frame of the display period, and in both the writing frame and the holding frame of the display period, numbers of the effective pulses of the first start signals are plural.

Optionally, in some embodiments of the present disclosure, in the writing frame, at least one effective pulse of the effective pulses of the first start signals at least partially overlaps the effective pulse of the second start signals.

Optionally, in some embodiments of the present disclosure, in the writing frame, the effective pulse of the second start signals at least partially overlaps a first one of the effective pulses of the first start signals.

Optionally, in some embodiments of the present disclosure, the display panel further includes a plurality of third strobe driving circuits connected in cascade and outputting a plurality of third strobe signals according to third start signals. Wherein, in the display period, the effective pulses of the first start signals and the effective pulse of the second start signals are all set in an action time of ineffective pulses of the third start signals.

Optionally, in some embodiments of the present disclosure, in the writing frame, at least a part of the effective pulses of the first start signals and the effective pulse of the second start signals are all set in an action time of a same ineffective pulse of the third start signals.

Optionally, in some embodiments of the present disclosure, in the holding frame, at least one effective pulse of the effective pulses of the first start signals are all set in an action time of a same ineffective pulse of the third start signals.

Optionally, in some embodiments of the present disclosure, in both the writing frame and the holding frame, numbers of effective pulses of the third start signals are greater than the numbers of the effective pulses of the first start signals.

Optionally, in some embodiments of the present disclosure, an action time of the effective pulses of the first start signals in the writing frame is same as an action time of the effective pulses of the first start signals in the holding frame.

Optionally, in some embodiments of the present disclosure, each of the pixel driving circuits further includes a seventh transistor, a source electrode and a drain electrode of the seventh transistor are electrically connected between a first reset signal line and the light-emitting device, and a gate electrode of the seventh transistor of the pixel driving circuits is electrically connected to the first strobe driving circuits connected in cascade.

Optionally, in some embodiments of the present disclosure, each of the pixel driving circuits further includes a fourth transistor, a fifth transistor, a sixth transistor, and a storage capacitor.

A source electrode and a drain electrode of the fourth transistor are electrically connected between a second reset signal line and the first node, and a gate electrode of the fourth transistor is electrically connected to a corresponding second strobe driving circuit. A source electrode and a drain electrode of the fifth transistor are electrically connected between the first voltage terminal and the second node. A source electrode and a drain electrode of the sixth transistor are electrically connected between the third node and the second voltage terminal. The storage capacitor is connected in series between the first node and the first voltage terminal.

Wherein, a gate electrode of the fifth transistor and a gate electrode of the sixth transistor are electrically connected to a same third strobe driving circuit, and in the writing frame, an action time of an effective pulse of the second strobe signals output from the corresponding second strobe driving circuit electrically connected to the gate electrode of the fourth transistor is earlier than an action time of an effective pulse of the second strobe signals output from a second strobe driving circuit electrically connected to the gate electrode of the third transistor.

The present disclosure further provides a display device including the display panel mentioned above and a timing controller. The timing controller is electrically connected to the first strobe driving circuits and the second strobe driving circuits.

Optionally, in some embodiments of the present disclosure, time intervals between adjacent effective pulses of the first start signals are same.

DETAILED DESCRIPTION

In order to make the purpose, technical solutions, and effects of the present disclosure clearer and more definite, the following further describes the present disclosure in detail with reference to the drawings and embodiments. It should be understood that the specific embodiments described herein are only used to explain the disclosure and are not used to limit the disclosure.

Figure 1:
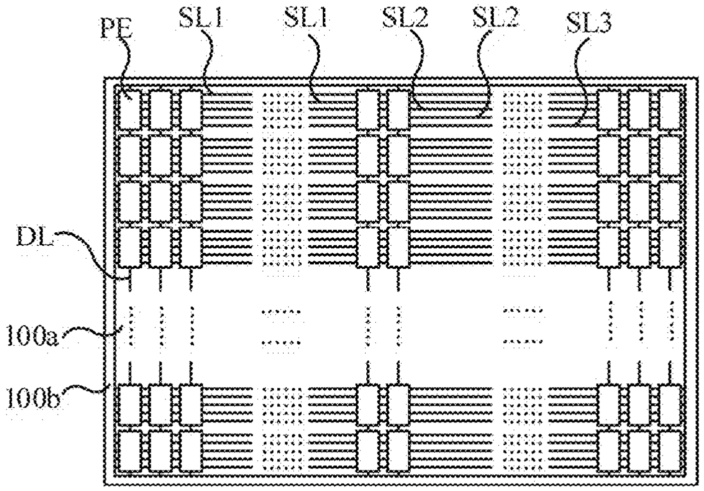
FIG. 1 is a schematic structural diagram of a display panel according to an embodiment of the present disclosure.

Specifically, FIG. 1 is a schematic structural diagram of a display panel according to an embodiment of the present disclosure. An embodiment of the present disclosure provides the display panel, which includes a plurality of pixel driving circuits, a plurality of strobe lines, a plurality of data lines DL, and a plurality of strobe driving circuits (not shown in the figures).

The plurality of pixel driving circuits are electrically connected to the plurality of strobe driving circuits by the plurality of strobe lines, and the plurality of data lines DL are electrically connected to the plurality of pixel driving circuits. The plurality of pixel driving circuits realize the display of the display panel according to data signals transmitted by the data lines DL and strobe signals output by the strobe driving circuits.

Each of the pixel driving circuits at least includes a light-emitting device PE, a first transistor T1, and a second transistor T2. Optionally, the light-emitting device PE includes an organic light-emitting diode, a mini light-emitting diode, or a micro-light-emitting diode. Optionally, a plurality of light-emitting devices PE are disposed in a display area 100*a* of the display panel. Wherein, the display area 100*a* of the display panel is used to realize the display function.

Figure 2:
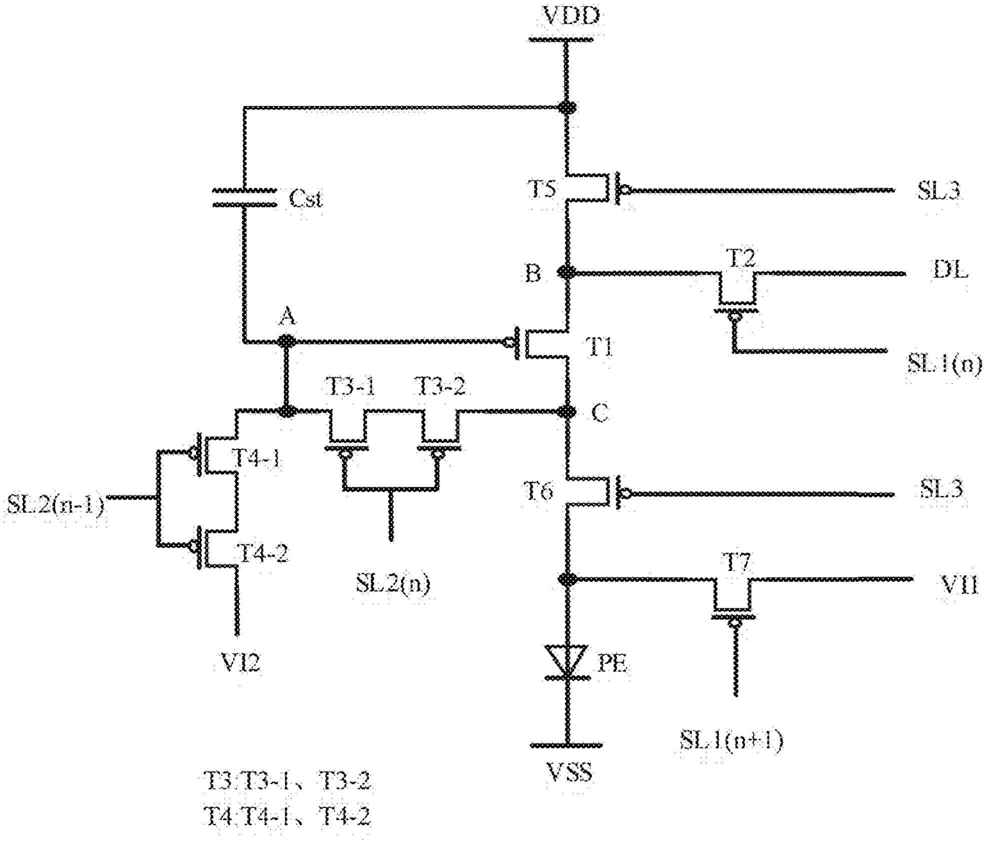
FIG. 2 is a schematic structural diagram of a pixel driving circuit according to an embodiment of the present disclosure.

Optionally, the first transistor T1, the second transistor T2, and the light-emitting device PE in the pixel driving circuits may be connected in a form shown in FIG. 2. Specifically, FIG. 2 is a schematic structural diagram of a pixel driving circuit according to an embodiment of the present disclosure. A gate electrode of the first transistor T1 is electrically connected to a first node A, one of a source electrode or a drain electrode of the first transistor T1 is electrically connected to a second node B, and another one of the source electrode or the drain electrode of the first transistor T1 is electrically connected to a third node C.

The source electrode and the drain electrode of the first transistor T1 are connected in series with the light-emitting device PE between a first voltage terminal VDD and a second voltage terminal VSS. Optionally, an anode of the light-emitting device PE is electrically connected to the third node C, and a cathode of the light-emitting device PE is electrically connected to the second voltage terminal VSS; or the anode of the light-emitting device PE is electrically connected to the first voltage terminal VDD, and the cathode of the light-emitting device PE is electrically connected to the second node B.

A source electrode and a drain electrode of the second transistor T2 are connected in series between a corresponding data line DL and the second node B, and a gate electrode of the second transistor T2 is electrically connected to a corresponding strobe line.

A source electrode and a drain electrode of the third transistor T3 are connected in series between the first node A and the third node C, and a gate electrode of the third transistor T3 is electrically connected to a corresponding strobe line. Optionally, the third transistor T3 is a double gate transistor, that is, the third transistor T3 includes a transistor T3-1 and a transistor T3-2.

The plurality of strobe driving circuits include a plurality of first strobe driving circuits (not shown in the figures) connected in cascade and a plurality of second strobe driving circuits (not shown in the figures) connected in cascade. Optionally, the plurality of strobe driving circuits are disposed in a non-display area 100*b* of the display panel. Wherein, the non-display area 100*b* of the display panel does not have the display function. Optionally, the non-display area 100*b* is disposed at peripheries of the display area 100*a*.

The plurality of first strobe driving circuits connected in cascade are electrically connected to the gate electrode of the second transistor T2 of the plurality of pixel driving circuits by one to one by corresponding strobe lines, and the plurality of first strobe driving circuits connected in cascade output a plurality of first strobe signals Scan1 according to first start signals STV1. Specifically, the strobe lines include a plurality of first strobe lines SL1, and the first strobe driving circuits are electrically connected to the gate electrode of the second transistor T2 of corresponding pixel driving circuits by the plurality of first strobe lines SL1. Optionally, the gate electrode of the second transistor T2 in the pixel driving circuits corresponding to the light-emitting devices PE in a same row is connected to a same first strobe line SL1. For example, the gate electrode of the second transistor T2 in the pixel driving circuits corresponding to the light-emitting devices PE in an n-th row is electrically connected to an n-th first strobe line SL1(*n*) transmitting an n-th stage of first strobe signal Scan1(*n*). Wherein, n is greater than 0 and is an integer.

The plurality of second strobe driving circuits connected in cascade are electrically connected to the gate electrode of the third transistor T3 of the plurality of pixel driving circuits by one to one by corresponding strobe lines, and the plurality of second strobe driving circuits connected in cascade output a plurality of second strobe signals Scan2 according to second start signals STV2. Specifically, the strobe lines include a plurality of second strobe lines SL2, and the second strobe driving circuits are electrically connected to the gate electrode of the third transistor T3 of corresponding pixel driving circuits by the plurality of second strobe lines SL2. Optionally, the gate electrode of the third transistor T3 in the pixel driving circuits corresponding to the light-emitting devices PE in the same row is connected to a same second strobe line SL2. For example, the gate electrode of the third transistor T3 in the pixel driving circuits corresponding to the light-emitting devices PE in the n-th row is electrically connected to an n-th second strobe line SL2(*n*) transmitting an n-th stage of second strobe signals Scan2(*n*).

Figure 3:
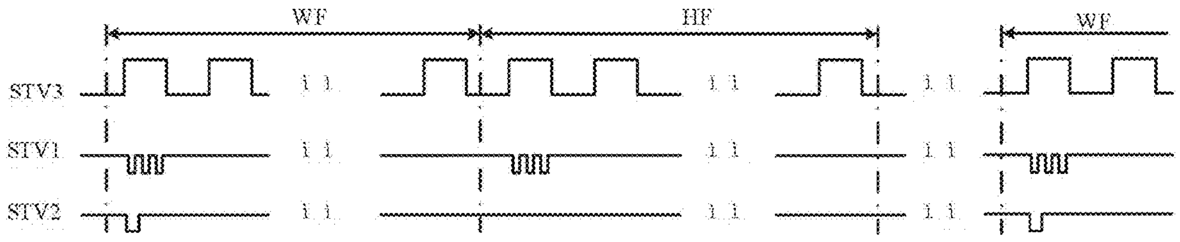
FIG. 3 is a timing diagram of first start signals, second start signals, and third start signals according to an embodiment of the present disclosure.

FIG. 3 is a timing diagram of the first start signals, the second start signals, and the third start signals according to an embodiment of the present disclosure. Effective pulses of the first start signals STV1 are set in a writing frame WF and a holding frame HF of one display period, and an effective pulse of the second start signals STV2 is set in the writing frame WF of the display period. Both in the writing frame WF and the holding frame HF of the display period, numbers of the effective pulses of the first start signals STV1 are plural. Therefore, in the writing frame WF and the holding frame HF, the first strobe driving circuits connected in cascade are allowed to output the plurality of first strobe signals according to the first start signals STV1 to reset the second node B of the pixel driving circuits multiple times, thereby continuously correcting a bias voltage of the first transistor T1 in the writing frame WF and the holding frame HF. Therefore, the display panel can display at a similar light-emitting brightness in both the writing frame WF and the holding frame HF, thereby improving a flickering problem of the display panel in the display period.

Wherein, the writing frame WF corresponds to a frame including a data writing phase, and the holding frame HF corresponds to a frame that does not include the data writing phase. In the data writing phase, the second transistor T2 and the third transistor T3 of the pixel driving circuits are turned on, and the data signals transmitted by the data lines DL are transmitted to the gate electrode of the first transistor T1 through the second transistor T2 and the third transistor T3. The effective pulses of the first start signals STV1 correspond to a voltage state of the first strobe signals Scan1 that can turn on the second transistor T2, and the effective pulse of the second start signals STV2 corresponds to a voltage states of the second strobe signals Scan2 that can turn on the third transistor T3. For example, the second transistor T2 and the third transistor T3 are both P-type transistors, and the effective pulses of the first start signals STV1 and the second start signals STV2 both correspond to a low electrical potential state.

It can be understood that one display period may include only one writing frame WF. When the display panel uses dynamic refresh frequencies to realize display, at least one display period may include one writing frame WF and at least one holding frame HF. In the display panel, the content displayed corresponding to the holding frame HF is same as the content displayed corresponding to the writing frame WF. That is, when the display panel is displayed in a low refresh frequency, the display period includes the writing frame WF and the holding frame HF.

Specifically, in one display period, a number of the effective pulses of the first start signals STV1 is greater than or equal to 4. Further, in the writing frame WF, a number of the effective pulses of the first start signals STV1 is greater than or equal to 2. When the display period includes only one holding frame HF, a number of the effective pulses of the first start signals STV1 in the holding frame HF may be greater than or equal to 2. When the display period includes a plurality of holding frames HF, a number of the effective pulses of the first start signals STV1 in each of the holding frames HF may be greater than or equal to 1.

Optionally, an action time of the effective pulses of the first start signals STV1 in the writing frame WF is same as an action time of the effective pulses of the first start signals STV1 in the holding frame HF. That is, in the holding frame HF, the first start signals STV1 repeat a timing of the writing frame WF, thereby reducing a control complexity of the display panel. Wherein, when the display period includes the plurality of holding frames HF, the first start signals STV1 may be made to repeat the timing of the writing frame WF in each of the holding frames HF. For example, when the display period includes one writing frame WF and one holding frame HF, the first start signals STV1 repeat the timing of the writing frame WF one time in the holding frame HF. When the display period includes one writing frame WF and three holding frames HF (that is, a frequency of the second start signals is 30 Hz), the first start signals STV1 repeat the timing of the writing frame WF one time respectively in the three holding frames HF. Therefore, a frequency of the first start signals STV1 can be increased relative to the second start signals STV2.

It can be understood that if a number of the effective pulses of the first start signals STV1 is larger, a number of times acts on the first strobe driving circuits connected in cascade will be larger, and a power consumption of the display panel will be larger. In addition, when the number of the effective pulses of the first start signals STV1 exceeds a certain quantity, the effect of improving the flickering problem is no longer significant if further increasing the number of the effective pulses of the first start signals STV1. Therefore, in one display period, the number of the effective pulses of the first start signals STV1 may be set according to actual requirements.

Figure 4:
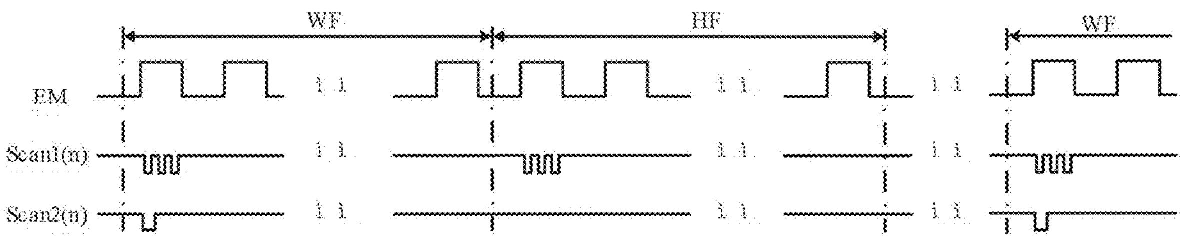
FIG. 4 is a timing diagram of first strobe signals, second strobe signals, and third strobe signals according to an embodiment of the present disclosure.

As shown in FIG. 4, FIG. 4 is a timing diagram of the first strobe signals, the second strobe signals, and the third strobe signals according to an embodiment of the present disclosure. Referring to FIGS. 2 to 4, in the writing frame WF of one display period, the plurality of pixel driving circuits sequentially transmit the data signals transmitted by the plurality of data lines DL to the gate electrode of the first transistor T1 according to the plurality of first strobe signals Scan1 and the plurality of second strobe signals Scan2. After that, the first start signals STV1 still output the effective pulses. Correspondingly, the first strobe driving circuits connected in cascade output the plurality of first strobe signals Scan1 in sequence according to the effective pulses of the first start signals STV1. The second transistor T2 of each of the pixel driving circuits responds to corresponding first strobe signals Scan1 and is turned on to allow the data signals transmitted by the data lines DL to be transmitted to the second node B, thereby correcting the bias voltage of the first transistor T1 in the writing frame WF. Therefore, a brightness variation range of the light-emitting device PE can be reduced, thereby realizing an objective of improving the flickering problem.

When a time interval between two adjacent effective pulses of the first start signals STV1 is longer, correspondingly, the brightness variation range of the light-emitting device PE corresponding thereto is larger, which is not beneficial to improve the flickering problem. Therefore, the first start signals STV1 in the writing frame WF may be set to have the plurality of effective pulses, and a certain time interval is defined between the plurality of effective pulses of the first start signals STV1. When the plurality of light-emitting devices PE realize the display of the display panel, the second node B in the pixel driving circuits are reset multiple times by corresponding time intervals. Therefore, the bias voltage of the first transistor T1 of the plurality of the pixel driving circuits can be corrected by the corresponding time intervals, and the brightness of the plurality of light-emitting devices PE can also be corrected by the corresponding time intervals. That is, the brightness variation range of the light-emitting devices PE can be reduced, thereby realizing the objective of improving the flickering problem.

Optionally, time intervals between adjacent effective pulses of the first start signals STV1 may be same or different. Further, the time intervals between the adjacent effective pulses of the first start signals STV1 are the same. The second node B of the plurality of pixel driving circuits is reset at a same time interval, so the bias voltage of the first transistor T1 is corrected at a same time interval. Therefore, the light-emitting brightness of all the light-emitting devices PE is corrected after reduced by a same range.

In the holding frame HF of the display period, the display panel needs to maintain a same display content as that in the writing frame, so the first start signals STV1 still need to output the plurality of effective pulses. Correspondingly, the first strobe driving circuits connected in cascade output the plurality of first strobe signals Scan1 multiple times according to the plurality of effective pulses of the first start signals STV1. The second transistor T2 of each of the pixel driving circuits responds to corresponding first strobe signals Scan1 each time and is turned on to allow the data signals transmitted by the data lines DL to be transmitted to the second node B multiple times, thereby correcting the bias voltage of the first transistor T1 in the holding frame HF multiple times. Therefore, the brightness variation range of the light-emitting devices PE can be reduced, thereby realizing the objective of improving the flickering problem.

Figure 5:
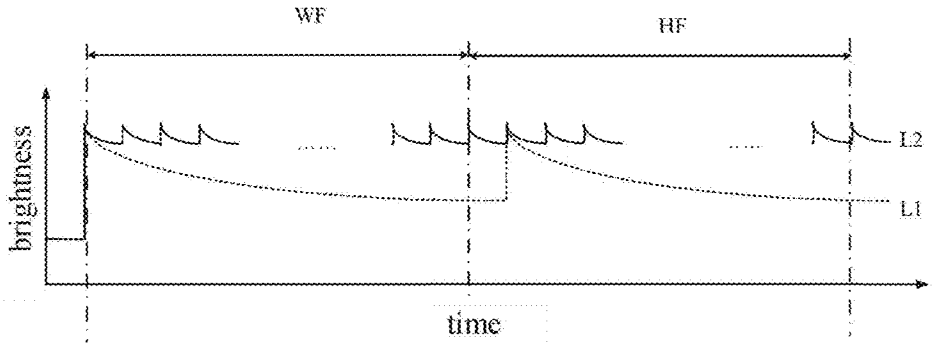
FIG. 5 is a schematic graph of brightness variations according to an embodiment of the present disclosure.

FIG. 5 is a schematic graph of brightness variations according to an embodiment of the present disclosure. A brightness variation curve L1 corresponds to a solution of the first start signals STV1 including only the effective pulses for transmitting the data signals in the writing frame WF and including the effective pulses for resetting the second node B in the holding frame HF. A brightness variation curve L2 corresponds to a solution of the first start signals STV1 including the effective pulses for transmitting the data signals in the writing frame WF and including the effective pulses for resetting the second node B multiple times in both the writing frame WF and the holding frame HF. From FIG. 5, it can be known that in the solution of the first start signals STV1 including the plurality of effective pulses for resetting the second node B in both the writing frame WF and the holding frame HF, the display panel can be allowed to adjust the brightness variation range of the light-emitting device PE multiple times right in the writing frame WF without waiting a time of the effective pulses of the first start signals STV1 in the holding frame HF to come. The brightness variation range of the light-emitting device PE in a period from the writing frame WF to the holding frame HF can be reduced, thereby being more beneficial to improve the flickering problem. In FIG. 5, only one display period including one holding frame HF is taken as an example. In some embodiments, one display period may include the plurality of holding frames HF. When one display period includes the plurality of holding frames HF, since the first start signals STV1 in each of the holding frames HF all have the plurality of effective pulses, the light-emitting device PE has a similar brightness variation range in each of the holding frames HF.

It can be understood that the data signals transmitted by the data lines DL may have different voltage value in the writing frame WF and the holding frame HF.

Specifically, in the writing frame WF, the data signals may have a first voltage value, and in the holding frame HF, the data signals may have a second voltage value. Wherein, the first voltage value is not equal to the second voltage value, so that the bias voltage of the first transistor T1 can be reset to a desired state according to the second voltage value. For example, when the first transistor T1 is a P-type transistor, the first voltage value may be greater than the second voltage value. Optionally, the first voltage value is greater than or equal to 0.5V and is less than or equal to 8V.

Optionally, in the writing frame WF, the data signals may have same or different voltage values. Specifically, when both the second transistor T2 and the third transistor T3 are turned on, the data signals may have a third voltage value, and when only the second transistor T2 is turned on, the data signals may have a fourth voltage value. Wherein, the third voltage value may be same as or different from the fourth voltage value.

Further, the third voltage value is same as the fourth voltage value, so that a same data signal can be continuously transmitted to the second node B in the writing frame WF, thereby allowing the light-emitting device PE to display more accurately according to the data signals. Optionally, the third voltage value is greater than or equal to 0.5V and is less than or equal to 8V. For example, the third voltage value may be equal to 0.5V, 0.6V, 0.7V, 0.8V, 0.9V, 1V, 1.2V, 1.5V, 1.8V, 2V, 2.5V, 3V, 3.5V, 4V, 4.5V, 5V, 5.5V, 6V, 6.5V, 7V, 7.5V, 7.8V, or 8V. It can be understood that the third voltage value may also be less than 0.5V or greater than 8V according to different supply voltage ranges of driver chips of display devices.

In order for the data signals to be transmitted to the gate electrode of the first transistor T1 in the data writing phase, in the writing frame WF, at least one effective pulse of the effective pulses of the first start signals STV1 at least partially overlaps the effective pulse of the second start signals STV2. Therefore, in the writing frame WF, at least one effective pulse of a plurality of effective pulses of the first strobe signals Scan1 can at least partially overlap an effective pulse of the second strobe signals Scan2, thereby allowing the second transistor T2 and the third transistor T3 to be turned on simultaneously at least in partial time.

Optionally, in the writing frame WF, the effective pulse of the second start signals STV2 at least partially overlaps a first one of the effective pulses of the first start signals STV1. Since the data signals can be transmitted to the gate electrode of the first transistor T1 only when the second transistor T2 and the third transistor T3 are turned on at the same time, if the first start signals STV1 further include a plurality of the effective pulses corresponding to a time before the effective pulse of the second start signals STV2, then since the effective pulse of the second start signals STV2 has not yet arrived, the second node B of the plurality of pixel driving circuits can be reset. However, at the moment when the effective pulse of the second start signals STV2 and the effective pulses of the first start signals STV1 coincide, the second node B will be rewritten with required data signals, that is, before the required data signals are transmitted to the gate electrode of the first transistor T1, resetting the second node B has little effect on improving the flickering problem.

Optionally, in the writing frame WF, a number of the effective pulses of the first start signals STV1 overlapping the effective pulse of the second start signals STV2 may be plural. For example, the number of the effective pulses of the first start signals STV1 overlapping the effective pulse of the second start signals STV2 may be 2 or 3, so that the gate electrode of the first transistor T1 can be written with data signals multiple times, thereby improving a responding speed of the pixel driving circuits.

It can be understood that the strobe driving circuits may adopt a circuit structure design in current technology, and will not be repeated herein. It can be understood that in some embodiments, the first strobe driving circuits and the second strobe driving circuits may also be called as gate driving circuits, and the first strobe signals Scan1 and the second strobe signals Scan2 may also be called as scan signals.

Referring to FIG. 2, each of the pixel driving circuits further includes a seventh transistor T7, a source electrode and a drain electrode of the seventh transistor T7 are electrically connected between a first reset signal line VI1 and the light-emitting device PE, and a gate electrode of the seventh transistor T7 of the pixel driving circuits is electrically connected to the first strobe driving circuits connected in cascade.

Optionally, in each of the pixel driving circuits, the gate electrode of the seventh transistor T7 and the gate electrode of the second transistor T2 are electrically connected to the first strobe lines SL1 transmitting the first strobe signals Scan1 of a same stage or different stages. For example, the gate electrode of the second transistor T2 in the pixel driving circuits corresponding to the light-emitting devices PE in the n-th row is electrically connected to the first strobe line SL1($n$) transmitting the n-th stage of first strobe signal Scan1($n$). The gate electrode of the seventh transistor T7 in the pixel driving circuits corresponding to the light-emitting devices PE in the n-th row is electrically connected to the first strobe line SL1($n$) transmitting the n-th stage of first strobe signal Scan1($n$), a first strobe line SL1($n$+1) transmitting an (n+1)-th stage of first strobe signal Scan1($n$+1), or a first strobe line SL1($n$−1) transmitting an (n−1)-th stage of first strobe signal Scan1($n$−1). Wherein, a first strobe driving circuit in an n-th stage outputs the n-th stage of first strobe signal Scan1($n$), a first strobe driving circuit in an (n+1)-th stage outputs the (n+1)-th stage of first strobe signal Scan1($n$+1), and a first strobe driving circuit in an (n−1)-th stage outputs the (n−1)-th stage of first strobe signal Scan1 ($n$−1).

Since the first start signals STV1 include the plurality of effective pulses in both the writing frame WF and the holding frame HF, first reset signals transmitted by the first reset signal line VI1 can be transmitted to the anode of the light-emitting device PE multiple times, thereby realizing multiple resets to a voltage of the anode of the light-emitting device PE.

Referring to FIG. 2, each of the pixel driving circuits further includes a fourth transistor T4, a fifth transistor T5, a sixth transistor T6, a seventh transistor T7, and a storage capacitor Cst.

A source electrode and a drain electrode of the fourth transistor T4 are electrically connected between a second reset signal line VI2 and the first node A, and a gate electrode of the fourth transistor T4 is electrically connected to a corresponding second strobe driving circuit. Optionally, the fourth transistor T4 is a double gate transistor, that is, the fourth transistor T4 includes a transistor T4-1 and a transistor T4-2.

Wherein, in order to ensure the time-division conduction of the third transistor T3 and the fourth transistor T4, the gate electrodes of the third transistor T3 and the fourth transistor T4 are electrically connected to the second strobe lines SL2 transmitting different stages of the second strobe signals Scan2. Further, in the writing frame WF, an action time of an effective pulse of the second strobe signals Scan2 output from the corresponding second strobe driving circuit electrically connected to the gate electrode of the fourth transistor T4 is earlier than an action time of an effective pulse of the second strobe signals Scan2 output from a second strobe driving circuit electrically connected to the gate electrode of the third transistor T3. Therefore, before the data signals are transmitted to the gate electrode of the first transistor T1, an electrical potential of the gate electrode of the first transistor T1 can be reset first. For example, the gate electrode of the third transistor T3 in the pixel driving circuits corresponding to the light-emitting devices PE in the n-th row is electrically connected to a second strobe line SL2($n$) transmitting an n-th stage of second strobe signal Scan2($n$). The gate electrode of the fourth transistor T4 in the pixel driving circuits corresponding to the light-emitting devices PE in the n-th row is electrically connected to a second strobe line SL2($n$−1) transmitting an (n−1)-th stage of second strobe signal Scan2($n$−1). Wherein, a second strobe driving circuit in an n-th stage outputs the n-th stage of second strobe signal Scan2($n$), and a second strobe driving circuit in an (n−1)-th stage outputs the (n−1)-th stage of second strobe signal Scan2($n$−1).

A source electrode and a drain electrode of the fifth transistor T5 are electrically connected between the first voltage terminal VDD and the second node B. A source electrode and a drain electrode of the sixth transistor T6 are electrically connected between the third node C and the second voltage terminal VSS. A gate electrode of the fifth transistor T5 and a gate electrode of the sixth transistor T6 are electrically connected to a corresponding strobe driving circuit.

Specifically, the strobe driving circuits further include a plurality of third strobe driving circuits (not shown in the figures) connected in cascade and outputting a plurality of third strobe signals EM according to third start signals STV3. The strobe lines further include a plurality of third strobe lines SL3. Optionally, the gate electrode of the fifth transistor T5 and the gate electrode of the sixth transistor T6 are electrically connected to a same third strobe driving circuit by the third strobe lines SL3.

The storage capacitor Cst is connected in series between the first node A and the first voltage terminal VDD.

Optionally, active layers of the first transistor T1 to the seventh transistor T7 include silicon semiconductors or oxide semiconductors. Further, the active layers of the first transistor T1 to the seventh transistor T7 all include low temperature polysilicon semiconductors.

In order to prevent resetting a plurality of second nodes B multiple times from affecting a light-emitting state of the light-emitting devices PE, in one display period, the effective pulses of the first start signals STV1 and the effective pulse of the second start signals STV2 are all set in an action time of ineffective pulses of the third start signals STV3. Wherein, the ineffective pulses of the third start signals STV3 correspond to a state of electrical levels of the third strobe signals EM that can turn off the fifth transistor T5 and the sixth transistor T6. For example, the fifth transistor T5 and the sixth transistor T6 are both P-type transistors, and the ineffective pulses of the third start signals STV3 correspond to a high level state.

In the writing frame WF, at least a part of the effective pulses of the first start signals STV1 and the effective pulse of the second start signals STV2 are set in an action time of a same ineffective pulse of the third start signals STV3.

That is, in the writing frame WF, the effective pulses of the first start signals STV1 and the effective pulse of the second start signals STV2 are all set in the action time of the same ineffective pulse of the third start signals STV3; or in the writing frame WF, the effective pulses of the first start signals STV1 are set in the action time of different ineffective pulses of the third start signals STV3, and at least a part of the effective pulses of the first start signals STV1 and the effective pulse of the second start signals STV2 are set in the action time of the same ineffective pulse of the third start signals STV3.

Optionally, in the writing frame WF, the effective pulses of the first start signals STV1 and the effective pulse of the second start signals STV2 are all set in the action time of the same ineffective pulse of the third start signals STV3, and the effective pulses of the first start signals STV1 and the effective pulse of the second start signals STV2 at least partially overlap with each other. Therefore, after ensuring that the data signals can be effectively transmitted to the first node A, the second node B can be reset multiple times, thereby allowing the bias voltage of the first transistor T1 to be continuously corrected in the action time of the same ineffective pulse of the third start signals STV3.

Optionally, in the writing frame WF, the effective pulses of the first start signals STV1 are set in the action time of different ineffective pulses of the third start signals STV3, at least a part of the effective pulses of the first start signals STV1 and the effective pulse of the second start signals STV2 are set in the action time of the same ineffective pulse of the third start signals STV3, and the effective pulses of the first start signals STV1 and the effective pulse of the second start signals STV2 in the action time of the same ineffective pulse of the third start signals STV3 are set to at least partially overlap with each other. Therefore, after ensuring that the data signals can be effectively transmitted to the first node A, the second node B can be reset multiple times to allow the bias voltage of the first transistor T1 to be continuously corrected in the action time of a plurality of the ineffective pulses of the third start signals STV3, thereby reducing a bias difference of the first transistor T1 in the writing frame WF.

Optionally, in the writing frame WF, the effective pulses of the first start signals STV1 being set in the action time of different ineffective pulses of the third start signals STV3 may refer to one effective pulse of the first start signals STV1 being set in the action time of one ineffective pulse of the third start signals STV3, or may also refer to a plurality of the effective pulses of the first start signals STV1 being set in the action time of one ineffective pulse of the third start signals STV3. When a plurality of the effective pulses of the first start signals STV1 are set in the action time of one ineffective pulse of the third start signals STV3, at least one ineffective pulse of the plurality of ineffective pulses of the third start signals STV3 may not correspond to the effective pulses of the first start signals STV1.

Optionally, in the holding frame HF, at least one effective pulse of the plurality of effective pulses of the first start signals STV1 is set in the action time of one ineffective pulse of the third start signals STV3. That is, in the holding frame HF, all the effective pulses of the first start signals STV1 may be set in the action time of a same ineffective pulse of the third start signals STV3, thereby allowing the bias voltage of the first transistor T1 to be continuously corrected in the action time of the same ineffective pulse of the third start signals STV3. Or in the holding frame HF, each of the effective pulses of the first start signals STV1 may be set in the action time of one ineffective pulse of the third start signals STV3, thereby allowing the bias voltage of the first transistor T1 to be continuously corrected in the action time of a plurality of the ineffective pulses of the third start signals STV3, and reducing the bias difference of the first transistor T1 in the holding frame HF.

Optionally, in the writing frame WF and the holding frame HF, numbers of the ineffective pulses of the third start signals STV3 both may be greater than or equal to 1. Correspondingly, in the writing frame WF and the holding frame HF, numbers of effective pulses of the third start signals STV3 both may be greater than or equal to 1.

Optionally, in the writing frame WF, when the effective pulses of the first start signals STV1 and the effective pulse of the second start signals STV2 are all set in the action time of the same ineffective pulse of the third start signals STV3, the number of the ineffective pulses of the third start signals STV3 in the writing frame WF is 1; and in the holding frame HF, when the effective pulses of the first start signals STV1 are all set in the action time of the same ineffective pulse of the third start signals STV3, the number of the ineffective pulses of the third start signals STV3 in the holding frame HF is 1.

Optionally, in the writing frame WF and the holding frame HF, the numbers of the ineffective pulses of the third start signals STV3 may be equal to or different from numbers of ineffective pulses of the first start signals STV1. For example, in the writing frame WF and the holding frame HF, when one effective pulse of the first start signals STV1 is set in the action time of one ineffective pulse of the third start signals STV3, that is, the plurality of effective pulses of the first start signals STV1 correspond to the plurality of ineffective pulses of the third start signals STV3 by one to one, the number of the ineffective pulses of the third start signals STV3 is equal to the number of the ineffective pulses of the first start signals STV1. In the writing frame WF and the holding frame HF, when one ineffective pulse of the third start signals STV3 corresponds to a plurality of the effective pulses of the first start signals STV1, the number of the ineffective pulses of the third start signals STV3 is less than the number of the ineffective pulses of the first start signals STV1.

Optionally, in the writing frame WF and the holding frame HF, the numbers of the ineffective pulses of the third start signals STV3 are both greater than the numbers of the ineffective pulses of the first start signals STV1. Correspondingly, in the writing frame WF and the holding frame HF, the numbers of the effective pulses of the third start signals STV3 are both greater than the numbers of the effective pulses of the first start signals STV1.

Since in the writing frame WF and the holding frame HF, the numbers of the ineffective pulses of the third start signals STV3 are both greater than the numbers of the ineffective pulses of the first start signals STV1, a switching frequency of the light-emitting device PE can be directly controlled by the fifth transistor T5 and the sixth transistor T6 of the pixel driving circuits, thereby improving the flickering problem.

Referring to FIGS. 2 to 4, taking the display panel using a dynamic refresh frequency for display, and a frequency of the third start signals STV3 being 120 Hz as an example, the timing sequence of the first start signals STV1, the second start signals STV2, and the third start signals STV3 are described.

When one display period includes one writing frame WF and one holding frame HF, the second start signals STV2 are transmitted to a first one of the plurality of second strobe driving circuits connected in cascade at a frequency of 60 Hz. That is, in the writing frame WF, the effective pulse output by the second start signals STV2 is transmitted to the first one of the plurality of second strobe driving circuits connected in cascade, and the plurality of second strobe driving circuits connected in cascade output a plurality of second strobe signals Scan2 to the plurality of pixel driving circuits in sequence, thereby allowing the third transistor T3 of the plurality of pixel driving circuits to response to corresponding second strobe signals Scan2 and to be turned on. A first one of the effective pulses output by the first start signals STV1 at least partially overlaps the effective pulse output by the second start signals STV2, and the first one of the effective pulses output by the first start signals STV1 is transmitted to a first one of the plurality of first strobe driving circuits connected in cascade. The first strobe driving circuits connected in cascade output the plurality of first strobe signals Scan1 to the pixel driving circuits in sequence to allow the second transistor T2 of the pixel driving circuits to respond to corresponding first strobe signals Scan1 and to be turned on, thereby allowing the data signals transmitted by the data lines DL to be transmitted to the first node A of the pixel driving circuits in sequence. After that, the second start signals STV2 continue to output a voltage state corresponding to the ineffective pulse until the time of a next writing frame WF arrives. The first start signals STV1 will output at least one effective pulse again after a certain period of time after outputting the first one of the effective pulses. Correspondingly, since the second start signals STV2 continue to output the voltage state corresponding to the ineffective pulse until the time of the next writing frame WF arrives, the at least one effective pulse output again by the first start signals STV1 is transmitted to the first one of the plurality of first strobe driving circuits connected in cascade. The plurality of first strobe driving circuits connected in cascade will output the plurality of first strobe signals Scan1 to the plurality of pixel driving circuits in sequence according to the effective pulses output by the first start signals STV1 each time. Therefore, the second transistor T2 of the plurality of pixel driving circuits responds to corresponding first strobe signals Scan1 and is turned on to allow the data signals transmitted by the data lines DL to be transmitted to the second node B, thereby realizing the multiple resets of the second node B, thereby realizing to continuously correct the bias voltage of the first transistor T1 in the writing frame WF.

In the holding frame HF, since the second start signals STV2 continue to output the voltage state corresponding to the ineffective pulse until the time of the next writing frame WF arrives, the at least one effective pulse output again by the first start signals STV1 in the holding frame HF is transmitted to the first one of the plurality of first strobe driving circuits connected in cascade. The plurality of first strobe driving circuits connected in cascade will output the plurality of first strobe signals Scan1 to the plurality of pixel driving circuits in sequence according to the effective pulses output by the first start signals STV1 each time. Therefore, the second transistor T2 of the plurality of pixel driving circuits responds to corresponding first strobe signals Scan1 and is turned on to allow the data signals transmitted by the data lines DL to be transmitted to the second node B, thereby realizing the multiple resets of the second node B, thereby realizing to continuously correct the bias voltage of the first transistor T1 in the holding frame HF.

The present disclosure further provides a display device. The display device includes any of the above-mentioned display panels and a driving module, and the driving module is electrically connected to the plurality of strobe driving circuits. Optionally, the driving module includes a timing controller (not shown in the figures). The timing controller is electrically connected to the first strobe driving circuits, the second strobe driving circuits, and the third strobe driving circuits for providing timing control signals for the strobe driving circuits. Optionally, the driving module further includes a processing chip, and the processing chip is electrically connected to the timing controller and the strobe driving circuits, thereby providing a plurality of control signals for the strobe driving circuits and the timing controller.

It can be understood that the display device includes a movable display device (such as a notebook computer, a mobile phone, etc.), a fixed terminal (such as a desktop computer, a TV, etc.), a measuring device (such as a sports bracelet, a thermometer, etc.), etc.

BENEFICIAL EFFECT

The present disclosure provides the display panel and the display device. Compared to current technology, by electrically connecting the gate electrode of the second transistor of the pixel driving circuits to the first strobe driving circuits and electrically connecting the gate electrode of the third transistor of the pixel driving circuits to the second strobe driving circuits, in the writing frame of the display period, the first strobe driving circuits and the second strobe driving circuits can respectively control the second transistor and the third transistor of the pixel driving circuits according to the first start signals and the second start signals to realize transmission of data signals. By setting the numbers of the effective pulses of the first start signals in both the writing frame and the holding frame of the display period to be plural, in the writing frame and the holding frame, the first strobe driving circuits connected in cascade are allowed to output the plurality of first strobe signals multiple times according to the first start signals to reset the second node of the pixel driving circuits multiple times, thereby continuously correcting a bias voltage of the first transistor in the writing frame and the holding frame. Therefore, the display panel can display at a similar light-emitting brightness in both the writing frame and the holding frame, thereby improving a flickering problem of the display panel in the display period.

Specific examples are used herein to explain the principles and implementation of the present disclosure. The descriptions of the above embodiments are only used to help understand the method of the present disclosure and its core ideas, and the content of the specification should not be construed as causing limitations to the present disclosure.

What is claimed is:

1. A display panel, comprising:

a plurality of pixel driving circuits, wherein each of the pixel driving circuits at least comprises a light-emitting device, a first transistor, a second transistor, and a third transistor; a gate electrode of the first transistor is electrically connected to a first node, one of a source electrode or a drain electrode of the first transistor is electrically connected to a second node, and another one of the source electrode or the drain electrode of the first transistor is electrically connected to a third node; and the source electrode and the drain electrode of the first transistor are connected in series with the light-emitting device between a first voltage terminal and a second voltage terminal, a source electrode and a drain electrode of the second transistor are connected in series between a corresponding data line and the second node, and a source electrode and a drain electrode of the third transistor are connected in series between the first node and the third node;

a plurality of first strobe driving circuits connected in cascade, wherein the first strobe driving circuits are electrically connected to a gate electrode of the second transistor of the pixel driving circuits and output a plurality of first strobe signals according to first start signals; and a plurality of second strobe driving circuits connected in cascade, wherein the second strobe driving circuits are electrically connected to a gate electrode of the third transistor of the pixel driving circuits and output a plurality of second strobe signals according to second start signals;

wherein the first strobe driving circuits and the second strobe driving circuits respectively control the second transistor and the third transistor of the pixel driving circuits to transmit data signals according to the first start signals and the second start signals;

wherein the data signals have a first voltage value in a writing frame of one display period, the data signals have a second voltage value in a holding frame of the display period, and the first voltage value is different from the second voltage value; and wherein in the writing frame, the first voltage value of the data signals comprises a third voltage value and a fourth voltage value, when both the second transistor and the third transistor are turned on, the data signals have the third voltage value; and when only the second transistor is turned on, the data signals have the fourth voltage value, wherein the third voltage value is different from the fourth voltage value.

2. The display panel according to claim 1, wherein the first voltage value is greater than or equal to 0.5 V and less than or equal to 8 V.

3. The display panel according to claim 1, wherein effective pulses of the first start signals are set in the writing frame and the holding frame of the display period, an effective pulse of the second start signals is set in the writing frame of the display period, and in both the writing frame and the holding frame of the display period, numbers of the effective pulses of the first start signals are plural.

4. The display panel according to claim 3, wherein in the writing frame, at least one effective pulse of the effective pulses of the first start signals at least partially overlaps the effective pulse of the second start signals.

5. The display panel according to claim 4, wherein in the writing frame, the effective pulse of the second start signals at least partially overlaps a first one of the effective pulses of the first start signals.

6. The display panel according to claim 5, further comprising:

a plurality of third strobe driving circuits connected in cascade and outputting a plurality of third strobe signals according to third start signals;

wherein in the display period, the effective pulses of the first start signals and the effective pulse of the second start signals are all set in an action time of ineffective pulses of the third start signals.

7. The display panel according to claim 6, wherein in the writing frame, at least a part of the effective pulses of the first start signals and the effective pulse of the second start signals are all set in an action time of a same ineffective pulse of the third start signals.

8. The display panel according to claim 7, wherein in the holding frame, at least one effective pulse of the effective pulses of the first start signals is set in an action time of a same ineffective pulse of the third start signals.

9. The display panel according to claim 7, wherein in both the writing frame and the holding frame, numbers of effective pulses of the third start signals are greater than the numbers of the effective pulses of the first start signals.

10. The display panel according to claim 5, wherein an action time of the effective pulses of the first start signals in the writing frame is same as an action time of the effective pulses of the first start signals in the holding frame.

11. The display panel according to claim 1, wherein each of the pixel driving circuits further comprises a seventh transistor, a source electrode and a drain electrode of the seventh transistor are electrically connected between a first reset signal line and the light-emitting device, and a gate electrode of the seventh transistor of the pixel driving circuits is electrically connected to the first strobe driving circuits connected in cascade.

12. The display panel according to claim 10, wherein each of the pixel driving circuits further comprises:

a fourth transistor, wherein a source electrode and a drain electrode of the fourth transistor are electrically connected between a second reset signal line and the first node, and a gate electrode of the fourth transistor is electrically connected to a corresponding second strobe driving circuit;

a fifth transistor, wherein a source electrode and a drain electrode of the fifth transistor are electrically connected between the first voltage terminal and the second node;

a sixth transistor, wherein a source electrode and a drain electrode of the sixth transistor are electrically connected between the third node and the second voltage terminal; and a storage capacitor connected in series between the first node and the first voltage terminal;

wherein a gate electrode of the fifth transistor and a gate electrode of the sixth transistor are electrically connected to a same third strobe driving circuit, and in the writing frame, an action time of an effective pulse of the second strobe signals output from the corresponding second strobe driving circuit electrically connected to the gate electrode of the fourth transistor is earlier than an action time of an effective pulse of the second strobe signals output from a second strobe driving circuit electrically connected to the gate electrode of the third transistor.

13. The display panel according to claim 3, wherein time intervals between adjacent effective pulses of the first start signals are equal.

14. A display device, comprising:

a display panel comprising a plurality of pixel driving circuits, a plurality of first strobe driving circuits connected in cascade, and a plurality of second strobe driving circuits connected in cascade; wherein each of the pixel driving circuits at least comprises a light-emitting device, a first transistor, a second transistor, and a third transistor; a gate electrode of the first transistor is electrically connected to a first node, one of a source electrode or a drain electrode of the first transistor is electrically connected to a second node, and another one of the source electrode or the drain electrode of the first transistor is electrically connected to a third node; the source electrode and the drain electrode of the first transistor are connected in series with the light-emitting device between a first voltage terminal and a second voltage terminal, a source electrode and a drain electrode of the second transistor are connected in series between a corresponding data line and the second node, and a source electrode and a drain electrode of the third transistor are connected in series between the first node and the third node; the first strobe driving circuits connected in cascade are electrically connected to a gate electrode of the second transistor of the pixel driving circuits and output a plurality of first strobe signals according to first start signals; and the second strobe driving circuits connected in cascade are electrically connected to a gate electrode of the third transistor of the pixel driving circuits and output a plurality of second strobe signals according to second start signals; and a timing controller electrically connected to the first strobe driving circuits and the second strobe driving circuits;

wherein the first strobe driving circuits and the second strobe driving circuits respectively control the second transistor and the third transistor of the pixel driving circuits to transmit data signals according to the first start signals and the second start signals;

wherein the data signals have a first voltage value in a writing frame of one display period, the data signals have a second voltage value in a holding frame of the display period, and the first voltage value is different from the second voltage value; and wherein in the writing frame, the first voltage value of the data signals comprises a third voltage value and a fourth voltage value, when both the second transistor and the third transistor are turned on, the data signals have the third voltage value; and when only the second transistor is turned on, the data signals have the fourth voltage value, wherein the third voltage value is different from the fourth voltage value.

15. The display device according to claim 14, wherein the first voltage value is greater than or equal to 0.5V and less than or equal to 8V.

16. The display device according to claim 14, wherein effective pulses of the first start signals are set in the writing frame and the holding frame of the display period, an effective pulse of the second start signals is set in the writing frame of the display period, and in both the writing frame and the holding frame of the display period, numbers of the effective pulses of the first start signals are plural.

17. The display device according to claim 16, wherein in the writing frame, at least one effective pulse of the effective pulses of the first start signals at least partially overlaps the effective pulse of the second start signals.

18. The display device according to claim 17, wherein in the writing frame, the effective pulse of the second start signals at least partially overlaps a first one of the effective pulses of the first start signals.

* * * * *